March 21, 1967 R. P. LAPPALA ETAL 3,310,453
TEAR RESISTANT MATERIAL
Filed Dec. 5, 1960 4 Sheets-Sheet 1

INVENTORS
RISTO P. LAPPALA
JOHN M. DIEHL
BY
ATTORNEY

March 21, 1967 R. P. LAPPALA ETAL 3,310,453
TEAR RESISTANT MATERIAL

Filed Dec. 5, 1960 4 Sheets-Sheet 3

INVENTORS
RISTO P. LAPPALA
JOHN M. DIEHL
BY
ATTORNEY

United States Patent Office 3,310,453
Patented Mar. 21, 1967

3,310,453
TEAR RESISTANT MATERIAL
Risto P. Lappala, Houston, Tex., and John M. Diehl, Madison, Wis., assignors to Bjorksten Research Laboratories, Inc., Madison, Wis., a corporation of Illinois
Filed Dec. 5, 1960, Ser. No. 73,912
11 Claims. (Cl. 161—49)

This application has subject matter in common with application Ser. No. 758,811, filed Sept. 3, 1958, which is a continuation-in-part of application Ser. No. 637,982, filed Feb. 4, 1957, now U.S. Patent 2,851,389, which was a continuation-in-part of application Ser. No. 367,317, filed July 10, 1953, now abandoned.

This invention relates to a tear resistant material comprising a non-woven grid of metal wire or metal strands embedded in a flexible synthetic resin lamination, said material adapted to provide greater tear resistance and to provide a material having greater strength than previous materials.

A superior tear resistant material has been desired which possessed the properties of being extremely strong, relatively light weight and extremely tear resistant so that when a tear or rip started in the material, the tear did not propagate or at least did not propagate easily across the material.

The material provided by the present invention is stronger and more tear resistant than previous materials since the material utilizes a grid of metal wire or strands embedded in an organic synthetic resin lamination. While the resin lamination may begin to tear, the metal wire or strands pile up and thus prevent the tear from lengthening. It may thus be seen that the metal wire grid due to its high strength will not break and will pile up relatively quickly to permit only the shortest tear in a material and will therefore provide a material having great tear strength.

It is therefore an object of the present invention to provide a material having extremely high tear resistance.

Another object is such a material which may be manufactured more easily and more economically than previous materials.

Another object is such a material capable of being manufactured in various thicknesses.

Another object is such a material which may be made utilizing adhesive and continuous synthetic resin films, or may be made by casting, dipping or other suitable method.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
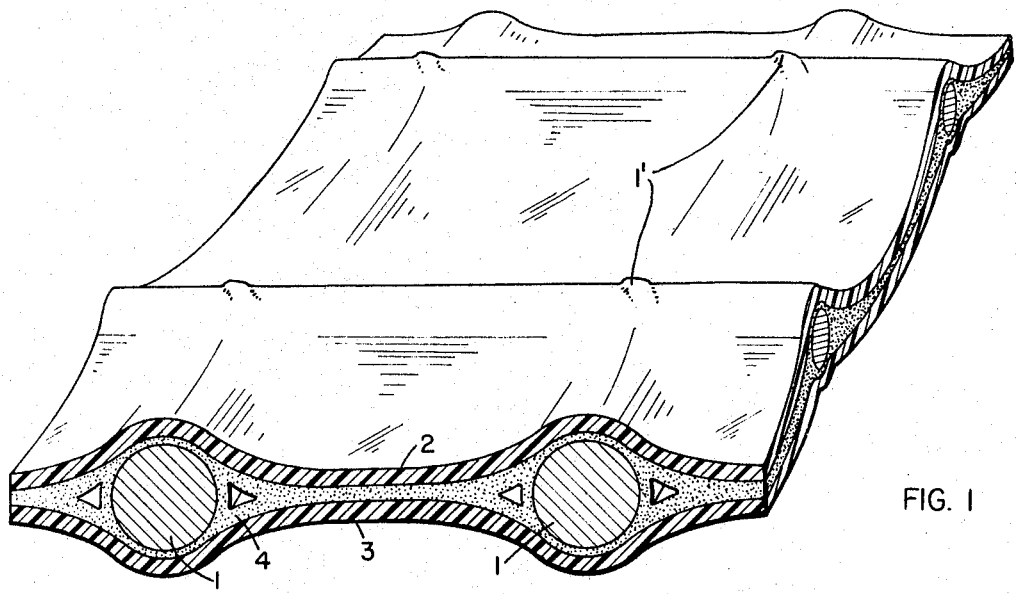
FIGURE 1 is a perspective view of a portion of a lamination of the invention.

Referring now to FIGURE 1, a grid of metal wire 1 is provided. Films 2 and 3 of flexible synthetic resin are then secured to each side of the grid with a tacky adhesive 4 which is adapted to remain tacky substantially permanently and not to harden.

Figure 2:
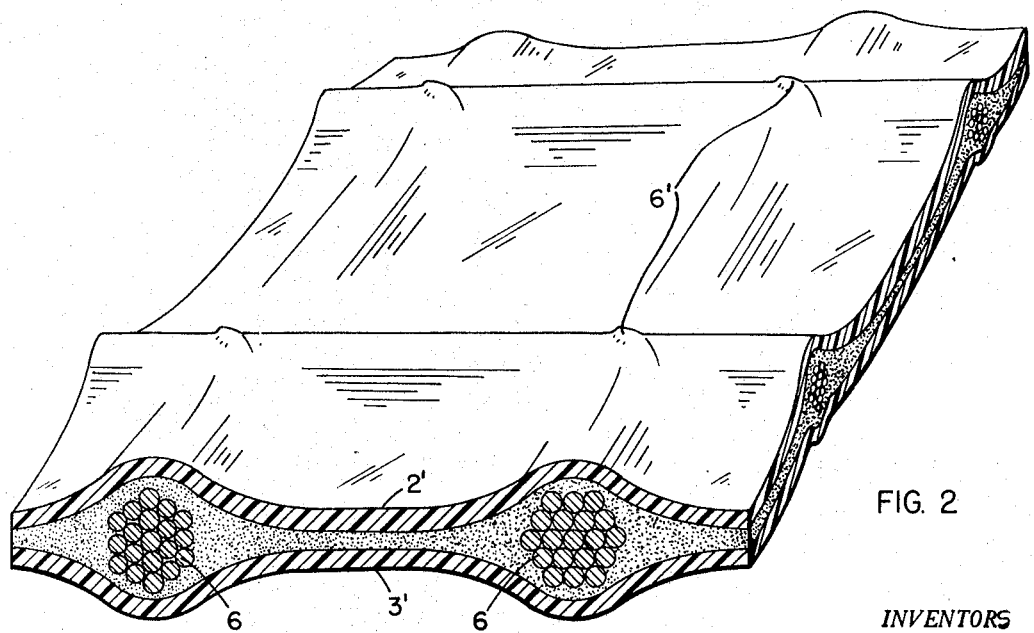
FIGURE 2 is a perspective view of a portion of another embodiment of the invention.

As shown in FIGURE 2, a grid of metal strands 6 is provided. Films 2' and 3' of flexible synthetic resin are then secured to each side of the grid with a tacky adhesive, which is adapted to remain tacky substantially permanently and not to harden to either flexible, rubbery or rigid form.

Figure 3:
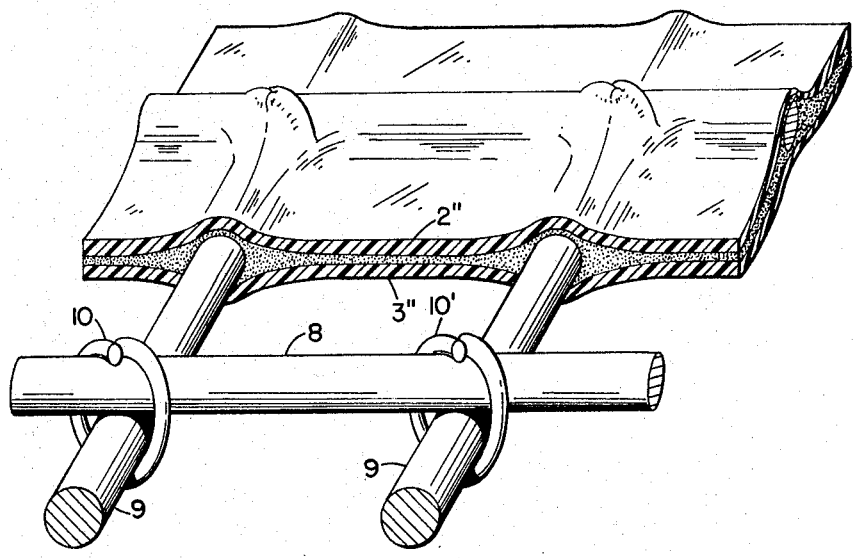
FIGURE 3 is a cut-away perspective view of a portion of another embodiment of the invention.

As shown in FIGURE 3, there is provided a non-woven grid of metal wire. Metal strands such as that of FIGURE 2 may be used in place of wire. Lateral wires 8 of the grid are loosely fastened to longitudinal wires 9 by means of a plurality of metal wire means such as loops or rings 10, 10', the loops being provided at each intersection of said lateral and longitudinal strands. Sheets 2" and 3" of synthetic resin are then secured to each side of the grid with an adhesive which may be tacky.

Fastening means such as that of FIGURE 3 which fasten together strands 1 in FIGURE 1 and strands 6 in FIGURE 2 may be provided at each intersection of strands and may cause a bump in the resin to appear as indicated respectively at 1' and at 6'.

The wire strand referred to herein is preferably a strand comprising a plurality of relatively thin wires twisted together. A strand may also comprise a plurality of strands, as shown in FIGURE 2, wherein a wire strand comprises five strands of seven wires each.

The materials of FIGURES 1–3 when torn undergo a characteristic action. The strands of the grid slide in the adhesive and pile up on one another. The loops, or rings loosely holding the lateral and longitudinal strands in position, slide along the strands and do not unduly restrict the strands from piling up, on one another and eventually preventing the tear from continuing.

The strands, as the resin begins to tear, pile up on one another and eventually prevent the tear from continuing.

The fastening means may be of a conventional form shown, used in attaching together the lateral and longitudinal wires in wire fence but must meet the requirements set forth above in connection with FIGURES 1–3 and set forth below with respect to being sufficiently loose or deformable to permit the strands to slide through them and rotate at the intersections with respect to each other when suitably stressed. A suitable wire grid may be embedded in a resinous lamination of organic synthetic resin which may be provided by passing a bare wire grid of the form shown through a bath of liquid synthetic resin material having a sufficiently high surface tension to form a liquid sheet extending across the spaces between the wires which may then solidfy after the article is withdrawn from the resin; such solidification may take place by reason of cooling if the resin is thermoplastic resin or by curing, vulcanization, crosslinking or further polymerization if the resin is a material which will undergo such further reaction. Thus the wire grid may be dipped in a liquid B stage phenolic resin and after removal from the resin the resultant composite article may be heated (as at a temperature of 200–400° C.) to cure the resin to the C stage. A phenolic resin which would be suitable for the invention may be a copolymer of phenol with formaldehyde, and butadiene. Resinous material in lamination 11' is preferably flexible and at least somewhat elastomeric.

Figure 4:
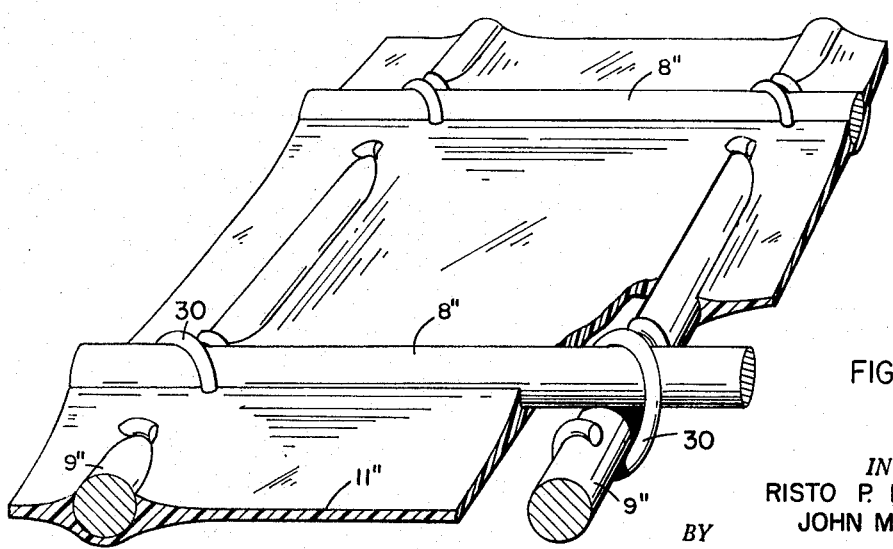
FIGURE 4 is a perspective view of a portion of another embodiment.

Referring now to FIGURE 4, there is shown a grid of longitudinal wires 9" and lateral wires 8", the wires of the grid being fastened together at the intersections by fastening means 30. A resinous lamination 11" may be attached to the grid of wires to provide a resinous web extending across the spaces between the wires. Lamination 11" may be applied in the manner of resinous lamination 11' by dipping of the grid so that only one side of it compacts a liquid bath of resinous material or it may be applied by bringing a bare wire grid into contact with a sheet of thermoplastic film and then heating either the grid or the film or both to cause at least at the portions of the film that are adjacent to the wires to become soft and then passing the grid and the wires together to cause the wires to be bonded to the resin as shown.

Figure 5:
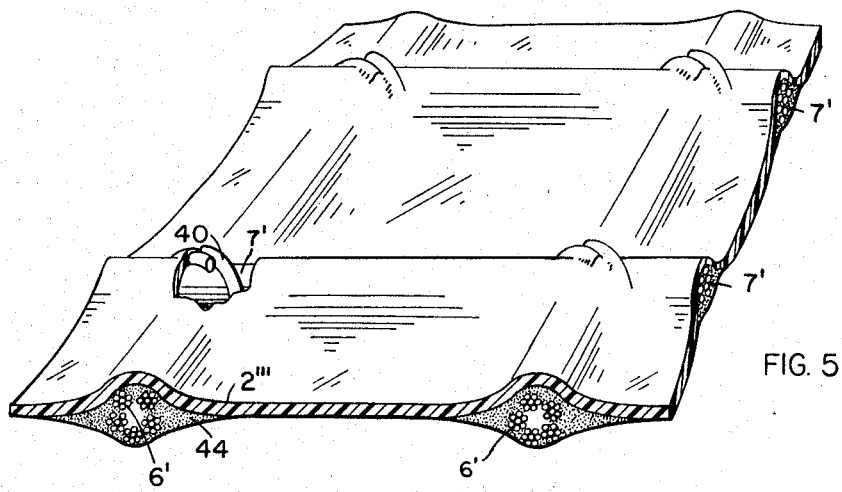
FIGURE 5 is a partially cut-away perspective view of a portion of still another embodiment.

Referring now to FIGURE 5, there is shown a grid formed by longitudinal wire strands 6' and lateral wire strands 7' the strands being composed of many small wires as hereinbefore described and being held together at the points of intersection by fastening means 40.

Each of fastening means 20, 30 and 40 may be formed from pieces of wire as shown or may be stamped out from flat sheets of metal and bent into suitable form. An important characteristic of these fastening means is that they hold the wires together at their points of intersection and yet allow the wires to easily change their angle of intersection, that is, rotate with respect to each other so that the spaces between the wires can be easily changed, for example, from rectangles to parallelograms and again to rectangles by suitable stressing of the composite material of the invention as well as allowing the strands to slide through the loops or rings so that the strands pile up as described above in connection with FIGURES 1–3. A film of organic synthetic resin 2''' which is flexible and non-porous may be attached to the grid of wire strands by means of adhesive 44.

The lamination organic synthetic resinous material, whether adhered to the grid of wires by being formed by dipping as described in connection with FIGURE 4 or affixed thereto as described in connection with the other figures, are preferably of flexible material which is foldable upon itself at least 500 times at the same place without cracking and which at its minimum thickness in the article does not exceed .020 inch thick and which is non-porous and relatively non-absorbent with respect to water.

Preferred material for strands and loops thus include wire twisted or untwisted wire strands of metals such as steel, copper, aluminum, silver, nickel, chromium, brass, magnesium, tin and alloys thereof.

Any suitable diameter of wire or wire strands may be used. The grid of strands may be rectilinear in form as shown in FIGURES 1, 2 and 3 or may have other suitable pattern such as a triangular grid or a hexagonal grid.

As shown in the figures, the grid or screen of strands is preferably non-woven. A non-woven grid is preferable in order to provide tear resistance.

The material, when torn, undergoes a characteristic action. The strands or wires of the grid instead of breaking, pile up on one another so that as the tear propagates in the synthetic resin films, more and more strands becomes stressed until the tear is stopped by virtue of a rope or cord formed by a plurality of strands extending across the tear substantially normal to the line of propagation of the tear itself. This behavior is charactistic of the material of the invention.

In those embodiments wherein a sheet of synthetic resinous film material is adhesively adhered to each side of the grid, the sheets may be of different synthetic resins. Generally it is preferable that if films are used, the films be transparent and flexible, however this is not necessary.

A preferred resin is a polyester formed by the condensation of ethylene glycol and terephthalic acid which is sold commercially as Mylar or Terylene, in which the polymer molecules have been oriented after formation of the film to provide great tensile and flexural strength.

The resin may be a similar polyester synthetic resin or may be another synthetic resin adapted to contribute other properties to the material such as printability, drape, feel, and so forth. It may for example be selected from the following group: polyethylene, plasticized or unplasticized films of polyvinyl chloride or polyvinyl acetate or polyvinylidene chloride or co-polymers of two or more of these, i.e., chlorinated polyethylene, chlorosulphonated polyethylene, polytetrafluoroethylene, polychlorotrifluoroethylene, other halogenated polyethylenes, polyvinyl fluoride, polyamides, polyvinyl alcohol, regenerated cellulose, cellulose esters such as cellulose acetate, cellulose ethers such as ethyl cellulose.

It is preferred that the resin be non-fibrous and non-porous. Material of a fibrous nature, such as paper and the like, is generally unsuitable.

Such material of a fibrous nature, generally including paper of all types such as kraft, glassine, bond and the like, generally exhibits the disadvantage that the crease-resistance of the best of such materials as represented by the ability to withstand repeated folding is very low as compared to a film of comparable thickness of synthetic resin and has the further disadvantage that a rip propagates in a direction controlled by the grain of the paper causing significant reduction in tear resistance.

Preferred resins are characterized by a high elongation (greater than about 20% up to 800%) before tensile failure. The elongation of paper sheets is not known to exceed about 5% at most and is generally 1 to 3%.

When films are utilized in the material the films may be adhered together with an adhesive which is adapted to remain tacky or non-setting permanently or for at least the life of the material which might reasonably be regarded as from 5 to 15 years. The adhesive may be transparent and must be transparent if a transparent embodiment of the structure is desired.

In order to provide decorative effects of various colors, a number of practices may be followed: carbon-black may be added to a resin to provide a black opaque film. A black opaque lamination 11'' may also be provided by utilizing an asphaltic or pitch compound as an adhesive. To provide decorative effects, color pigments may be added to an otherwise transparent or clear adhesive.

Various examples of the material of the invention were prepared as shown in Table 1.

TABLE 1.—ADHESIVES

Adhesive designation: Formulation
- A ------- 100 parts synthetic Butyl (Note 2) rubber sold commercially as GR–I–17 by Enjay.
  - 33 parts mixture of two or more chlorinated biphenyls (Note 1) (Arochlor 5460).
  - 200 parts xylene.
- B ------- 2 parts synthetic Butyl rubber sold commercially as GR–I–25 by Enjay.
  - 1 part mixture of two or more chlorinated biphenyls (Note 1) (Arochlor 1262).
  - 5 parts xylene.
- C ------- 2 parts synthetic Butyl rubber sold commercially as GR–I–15 by Enjay.
  - 1 part mixture of two or more chlorinated viphenyls (Note 1) Arochlor 5460).
  - 5 parts xylene.
- D ------- 16 parts synthetic Butyl rubber sold commercially as GR–I–17 by Enjay.
  - 5 parts mixture of two or more chlorinated biphenyls (Note 1) (Arochlor 5460).
  - 40 parts kerosene fraction.
- E ------- Blackstrap molasses.
- F ------- Asphalt dissolved in hydrocarbon.

Note 1.—Mixture comprising two or more of the following chlorinated biphenyls:

monochlorobiphenyl
dichlorobiphenyl
trichlorobiphenyl
tetrachlorobiphenyl
pentachlorobiphenyl
hexachlorobiphenyl
heptachlorobiphenyl
octachlorobiphenyl nonachlorobiphenyl
decachlorobiphenyl Note 2.—Butyl (trademark, registered by Standard Oil Company of New Jersey) is an isobutylene-diolefin copolymer. It is a vulcanizable hydrocarbon rubber which is not readily attacked by oxygen, ozone, acid, alkalis and other chemical agents which are harmful to natural (Hevea) rubber. It has low unsaturation. The specific gravity of Butyl is 0.92. It is a solid, elastic, odorless non-toxic, light colored hydrocarbon rubber. It is manufactured according to the specifications of the Reconstruction Finance Corporation office of Rubber Reserve, effective January 1, 1947, and revised April 1, 1947, March 15, 1948, and June 1, 1948. The specification limits for GR–I are:

Chemical properties:
- Volatile Matter, percent max. ............... 0.30
- Ash, percent max. ........................... 0.50
- Stabilizer, percent min. .................... 0.10

Viscosity—Mooney plasticity (large rotor, 8 min. at 212° F.): Revolutions
- Min. ........................................ 41
- Max. ........................................ 49

| Physical properties at 82° F. | Cure at 307° F., min. | | |
|---|---|---|---|
| | 20 | 40 | 80 |
| Tensile strength, p.s.i., min. | | 2,500 | |
| Ultimate elongation, percent, min. | | 650 | |
| Modulus at 400% elongation, p.s.i.: | | | |
| Minimum | 575 | 875 | 1,200 |
| Maximum | 775 | 1,125 | 1,500 |

GR–I–15 is similar to GR–I except that it contains a greater proportion of diolefin and, therefore, exhibits a faster rate of cure. The specifications for Mooney plasticity and chemical properties are the same as for GR–I. GR–I–25 is more unsaturated then GR–I–15 and, therefore, is faster curing. The specifications for Mooney plasticity and chemical properties are the same as for GR–I. GR–I–17 is believed to be between GR–I–15 and GR–I–25 with respect to proportion of diolefin and rate of cure.

The adhesive must be flexible. Suitable adhesives may be provided by omitting the non-rubbery ingredient in formulations A to D above.

It may thus be seen that my invention comprises a tear resistant material comprising a non-woven grid of metal wire or strands embedded in a flexible synthetic resin. The resin utilized may be in the form of preformed sheets or may be cast into the form of reinforced sheets.

It should also be noted that it is sometimes preferable to join the lateral strands of the grid to the longitudinal strands by means of loops or rings of metal or other suitable material.

It may thus be seen that the invention is broad in scope and is not to be limited excepting by the claims. Having thus disclosed our invention, we claim:

1. A tear resistant material comprising a non-woven grid comprising at least two sets of cross-laid, elongated metal strands which intersect, a single lamina of elongatable, non-porous, flexible, foldable synthetic resin contiguous and coextensive with the strands of said grid, said strands provided with encircling metal fastening means at the intersections thereof which hold said members together yet do not unduly restrict the sliding of said strands with respect to each other and do not unduly restrict the sliding of said fastening means with respect to said strands and do not unduly restrict the free-varying of the angles of intersection of said strands.

2. The tear resistant material of claim 1 further characterized by said non-woven grid being of metal wire.

3. The tear resistant material of claim 1, said resin being in the form of one film, said film being adhesively attached to said non-woven grid by a flexible adhesive.

4. The tear resistant material of claim 1 wherein the members of said metal grid are at least partially embedded in said lamina of flexible synthetic resin.

5. The tear resistant material of claim 1 wherein said metal members comprising said non-woven grid are fully and entirely embedded in said lamina of flexible synthetic resin.

6. A tear resistant material comprising a non-woven spaced grid of cross-laid metal members and a lamina of elongatable, non-porous, flexible, foldable synthetic resin coextensive and contiguous with said grid to close the spaces therein, said non-woven grid consisting of longitudinal members and lateral members, said longitudinal members being joined to said lateral members by metal loop means.

7. The tear resistant material of claim 6 further characterized by said non-woven grid being of metal wire.

8. The tear resistant material of claim 6 further characterized by said non-woven grid being of metal strands.

9. The tear resistant material of claim 6, said film of synthetic resin being adhesively attached to said members of said grid with a flexible adhesive.

10. The tear resistant material of claim 6 wherein the members of said metal grid are at least partially embedded in said lamina of flexible synthetic resin.

11. The tear resistant material of claim 6 wherein said metal members comprising said non-woven grid are fully and entirely embedded in said lamina of flexible synthetic resin.

References Cited by the Examiner

UNITED STATES PATENTS

| | | | |
|---|---|---|---|
| 1,012,347 | 12/1911 | Frederick | 245—3 |
| 2,071,926 | 2/1937 | Geerlings | 164—145 X |
| 2,387,227 | 10/1945 | Andersen et al. | 264—322 X |
| 2,708,177 | 5/1955 | Fries et al. | 161—49 |
| 2,739,092 | 3/1956 | Stevenson | 161—64 |
| 2,742,391 | 4/1956 | Warp | 161—115 X |
| 2,851,389 | 9/1958 | Lappala | 161—143 |

A. WYMAN, *Primary Examiner.*

CARL F. KRAFFT, *Examiner.*

H. L. GATEWOOD, G. D. MORRIS,
*Assistant Examiners.*